United States Patent
Hulvey et al.

(10) Patent No.: US 9,179,136 B2
(45) Date of Patent: Nov. 3, 2015

(54) METHOD AND SYSTEM FOR SYNCHRONIZING 3D SHUTTER GLASSES TO A TELEVISION REFRESH RATE

(75) Inventors: Robert William Hulvey, Redondo Beach, CA (US); Shawn Shiliang Ding, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 278 days.

(21) Appl. No.: 12/943,741

(22) Filed: Nov. 10, 2010

(65) Prior Publication Data

US 2011/0122238 A1  May 26, 2011

Related U.S. Application Data

(60) Provisional application No. 61/281,893, filed on Nov. 20, 2009, provisional application No. 61/313,489, filed on Mar. 12, 2010.

(51) Int. Cl.
*H04N 13/04* (2006.01)
*H04N 9/47* (2006.01)

(52) U.S. Cl.
CPC ....... *H04N 13/0438* (2013.01); *H04N 13/0497* (2013.01); *H04N 2013/0461* (2013.01); *H04N 2213/008* (2013.01)

(58) Field of Classification Search
USPC ..................................... 348/42–60
See application file for complete search history.

(56) References Cited

U.S. PATENT DOCUMENTS 4,967,268 A * 10/1990 Lipton et al. .................... 348/56
6,188,442 B1 * 2/2001 Narayanaswami ........... 348/564
6,456,432 B1    9/2002 Lazzaro et al.
(Continued)

FOREIGN PATENT DOCUMENTS

CN       1235484 A   11/1999
CN     101315748 A   12/2008
(Continued)

OTHER PUBLICATIONS

English-Language Abstract for Chinese Patent Publication No. 1235484 A, published Nov. 17, 1999; 1 page.
(Continued)

*Primary Examiner* — Joseph Ustaris
*Assistant Examiner* — Talha Nawaz
(74) *Attorney, Agent, or Firm* — Sterne, Kessler, Goldstein & Fox P.L.L.C.

(57) ABSTRACT

A 3D shutter glasses device, coupled via a wireless link to a 3D video display device, maintains a slave clock synchronized with a master clock in the display device. The clocks may comprise Bluetooth clocks. The shutter glasses receive 3D frame display information and time information referenced to the master clock that corresponds to when frames are displayed. The shutter glasses control opening and closing of left and right shutters utilizing slave clock time and the received information. The received display information comprises left, right and/or blank frame pattern information, a frame pattern time interval, a frame refresh rate and a time offset for delaying opening and/or closing of shutters. The time information indicates master clock time when frames are displayed. The shutter glasses and the display maintain synchronization when display and/or time information updates are skipped. The shutter glasses may transmit information to the display device.

24 Claims, 6 Drawing Sheets

(56) References Cited

U.S. PATENT DOCUMENTS

| | | | |
|---|---|---|---|
| 8,077,180 B1* | 12/2011 | Tremblay | 345/501 |
| 8,300,087 B2 | 10/2012 | Hulyalkar et al. | |
| 8,303,112 B2 | 11/2012 | Jacobs et al. | |
| 8,363,095 B2* | 1/2013 | Mitani et al. | 348/56 |
| 2001/0043266 A1 | 11/2001 | Robinson et al. | |
| 2005/0077450 A1* | 4/2005 | Baer | 250/208.1 |
| 2007/0085902 A1 | 4/2007 | Walker et al. | |
| 2007/0147827 A1* | 6/2007 | Sheynman et al. | 396/325 |
| 2007/0195408 A1* | 8/2007 | Divelbiss et al. | 359/462 |
| 2007/0247477 A1 | 10/2007 | Lowry et al. | |
| 2007/0263003 A1 | 11/2007 | Ko et al. | |
| 2008/0284801 A1* | 11/2008 | Brigham et al. | 345/690 |
| 2008/0291863 A1* | 11/2008 | Agren | 370/315 |
| 2008/0291891 A1* | 11/2008 | Jerlhagen et al. | 370/350 |
| 2008/0303963 A1* | 12/2008 | Jung et al. | 349/13 |
| 2009/0051759 A1* | 2/2009 | Adkins et al. | 348/53 |
| 2009/0109282 A1* | 4/2009 | Schnebly et al. | 348/55 |
| 2009/0213242 A1 | 8/2009 | Rofougaran et al. | |
| 2009/0237495 A1* | 9/2009 | Kawahara | 348/56 |
| 2010/0007582 A1 | 1/2010 | Zalewski | |
| 2010/0194857 A1* | 8/2010 | Mentz et al. | 348/43 |
| 2010/0201812 A1 | 8/2010 | McGibney et al. | |
| 2010/0238274 A1* | 9/2010 | Kim et al. | 348/51 |
| 2010/0289883 A1 | 11/2010 | Goris et al. | |
| 2010/0328533 A1* | 12/2010 | Mitani et al. | 348/521 |
| 2011/0001808 A1* | 1/2011 | Mentz et al. | 348/59 |
| 2011/0025821 A1 | 2/2011 | Curtis et al. | |
| 2011/0063298 A1 | 3/2011 | Hulyalkar et al. | |
| 2011/0090324 A1* | 4/2011 | Mentz et al. | 348/55 |
| 2011/0096146 A1* | 4/2011 | Hulyalkar et al. | 348/43 |
| 2011/0122237 A1 | 5/2011 | Hong | |
| 2011/0134231 A1 | 6/2011 | Hulvey et al. | |
| 2011/0199464 A1* | 8/2011 | MacNaughton et al. | 348/53 |
| 2011/0205344 A1* | 8/2011 | Lee | 348/56 |
| 2011/0205347 A1 | 8/2011 | MacNaughton et al. | |
| 2011/0254935 A1 | 10/2011 | MacNaughton et al. | |
| 2011/0254936 A1 | 10/2011 | MacNaughton et al. | |
| 2011/0292191 A1* | 12/2011 | MacNaughton et al. | 348/56 |
| 2012/0194660 A1 | 8/2012 | Nakamura et al. | |
| 2012/0257027 A1 | 10/2012 | Kawahara | |
| 2013/0038688 A1 | 2/2013 | Jacobs et al. | |
| 2013/0050423 A1* | 2/2013 | Hulyalkar et al. | 348/43 |

FOREIGN PATENT DOCUMENTS

| | | |
|---|---|---|
| EP | 1 995 910 A2 | 11/2008 |
| WO | WO 2010/091113 A2 | 8/2010 |

OTHER PUBLICATIONS

English-Language Abstract for Chinese Patent Publication No. 101315748 A, published Dec. 3, 2008; 1 page.

First Office Action directed to related Chinese Patent Application No. 201010553694.3, mailed Mar. 29, 2013; 7 pages.

Specification of the Bluetooth System—Wireless Connections made Easy, Version 2.0 + EDR, Nov. 4, 2004; 1230 pages.

Specification of Bluetooth Standard, Nov. 4, 2004

European Search Report and Opinion directed to related European Patent Application No. EP 10 01 4571, mailed Apr. 10, 2014; 8 pages.

* cited by examiner

METHOD AND SYSTEM FOR SYNCHRONIZING 3D SHUTTER GLASSES TO A TELEVISION REFRESH RATE

CROSS-REFERENCE TO RELATED APPLICATIONS/INCORPORATION BY REFERENCE

This application makes reference to, claims priority to, and claims the benefit of U.S. Provisional Application Ser. No. 61/281,893, filed on Nov. 20, 2009, which is incorporated herein by reference in its entirety.

This application also makes reference to, claims priority to, and claims the benefit of U.S. Provisional Application Ser. No. 61/313,489, filed on Mar. 12, 2010, which is incorporated herein by reference in its entirety.

FIELD OF THE INVENTION

Certain embodiments of the invention relate to communication systems. More specifically, certain embodiments of the invention relate to synchronizing 3D shutter glasses to a television refresh rate.

BACKGROUND OF THE INVENTION

Video content may be recorded in two-dimensional (2D) format or in three-dimensional (3D) format. In various applications such as, for example, DVD movies and TV, a 3D video is often desirable because it is often more realistic to viewers than the 2D counterpart. A 3D video comprises left view frames and right view frames. 3D glasses may be utilized for viewing 3D video content. Exemplary 3D glasses may utilize polarizing technology or shutter techniques, for example.

In order to produce images which can be viewed by consumers with a 3-dimensional (3D) effect, videos are often filmed and rendered stereoscopically. For example, to produce video, a stream of images may be produced for viewing with the right eye and another stream of images may be produced for viewing with the left eye. The images are typically taken such that one of the image streams is taken from a perspective which is slightly offset from the other, in the same way that the perspective seen by the right eye is slightly offset from that seen by the left eye.

Various display systems for 3D video, such as televisions and film or video projectors, display a stream of images in sequence at a rate known as the refresh rate. One popular system for reproducing these 3D videos involves displaying images at twice the normal refresh rate of non-3D video, alternating images for the left and right eyes. A viewer may wear glasses which contain LC shutters, for example, that are electronically controlled such that the left eye shutter is open when an image for the left eye is being displayed, and the right eye shutter is open when an image for the right eye is being displayed.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for synchronizing 3D shutter glasses to television refresh rate.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for synchronizing 3D shutter glasses to a television refresh rate. In accordance with various embodiments of the invention, a 3D video viewing shutter device that is communicatively coupled, wirelessly, to a 3D video display device may generate a slave clock based on a master clock in the 3D video display device. The 3D video viewing shutter device may maintain synchronization with the master clock. The 3D video viewing shutter device may receive from the 3D video display device, information about display of 3D video frames and time information that is referenced to the master clock. The time information may correspond to a time of the display of the 3D video frames. The 3D video viewing shutter device may determine when to open and close left and right shutters to correspond to the time of the display of the 3D video frames. The determination may be based on the generated slave clock, the received information about the display of the 3D video frames and/or the received time information that is referenced to the master clock. The slave clock and the master clock may comprise a Bluetooth slave clock and a Bluetooth master clock respectively. The information about the display of 3D video frames may comprise information about a pattern of left, right and/or blank frames that are displayed on the 3D video display device. Furthermore, the information about the display of 3D video frames may comprise length of a time interval that corresponds to display of a pattern of left, right and/or blank frames that are displayed on the 3D video display device. The invention may further enable viewing of independent video streams by two or more individuals.

The information about the display of 3D video frames may comprise a refresh rate for displaying left, right and/or blank frames that are displayed on the 3D video display device. The time information that is referenced to the master clock may indicate master clock time that corresponds to the display of 3D video frames. The information about the display of 3D video frames may comprise a time offset for delaying opening and/or closing of left and right shutters. Opening and closing of the left and right shutters may be based on the generated slave clock, the received information about the display of 3D video frames and the received time information that is referenced to the master clock. A correspondence in time between time of the opening and closing of the left and right shutters and the time of the display of the 3D video frames may be maintained even when new information about the display of 3D video frames, and new time information that is referenced to the master clock, is not received and/or not utilized. In various embodiments of the invention, information comprising, for example, timing, configuration, security and/or capabilities information may be transmitted by the 3D video viewing shutter device to the 3D video display device. In this manner, 3D shutter glasses may be synchronized and operated in time with display of a 3D video utilizing a Bluetooth wireless interface between the 3D shutter glasses and a 3D video display device.

Figure 1A:
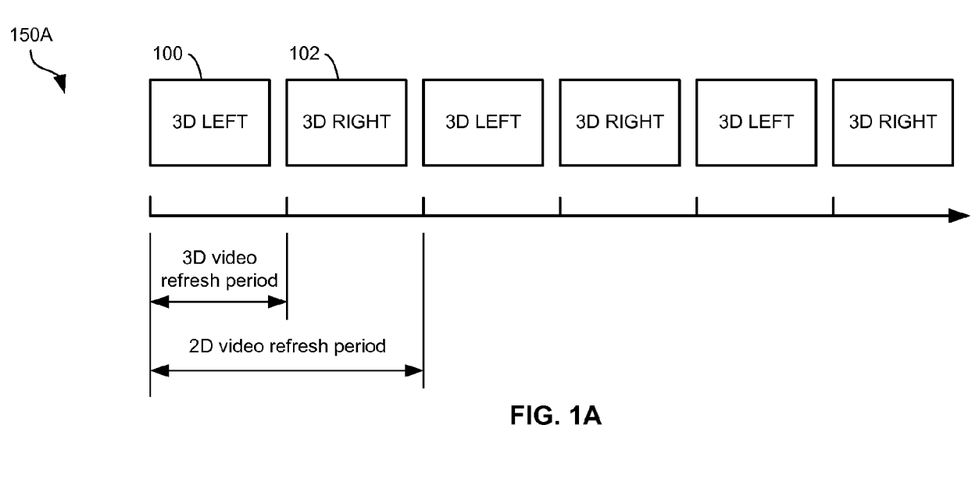
FIG. 1A is a diagram that illustrates an exemplary sequence of left and right 3D video frames, in accordance with an embodiment of the invention.

FIG. 1A is a diagram that illustrates an exemplary sequence of left and right 3D video frames, in accordance with an embodiment of the invention. Referring to FIG. 1A, there is shown a sequence of left view and right view 3D video frames 150A that comprises a left view frame 100 and a right view frame 102.

The sequence of left view and right view 3D video frames 150A may comprise stereoscopic video and/or graphics images. The left view frame 100 and the right view frame 102 may comprise images of the same subject matter that are seen from slightly different angles and when viewed sequentially, may create an illusion of a three dimensional image. Left view frames and right view frames may be referred to as left frames and right frames. Alternatively, the sequence of frames 150A may comprise alternating images from different video sequences that may be viewed concurrently by different people. The different video sequences may comprise different and/or independent content instead of left and right views. For example, the frame 100 may comprise an image from a first video sequence and the frame 102 may comprise an image from a second video sequence. Two people may view the two sequences concurrently, for example, utilizing shutter glasses. In this regard, one person may view the first sequence with shutter glasses for which both lenses are open during display of frames from the first sequence and closed during display of frames from the second sequence while another person may view the second sequence with shutter glasses for which both lenses are open during display of frames from the second sequence and closed during display of frames from the first sequence. The frames from the first sequence may be considered analogous to the left view 3D frames and the frames from the second sequence may be considered analogous to the right view 3D frames, for example. In some instances, the frames from the first sequence may be referred to as left view 3D frames and the frames from the second sequence may be referred to as the right view 3D frames. In this manner, various embodiments of the invention may enable viewing of independent video streams by two or more individuals rather than viewing of left and right 3D video streams.

Figure 2:
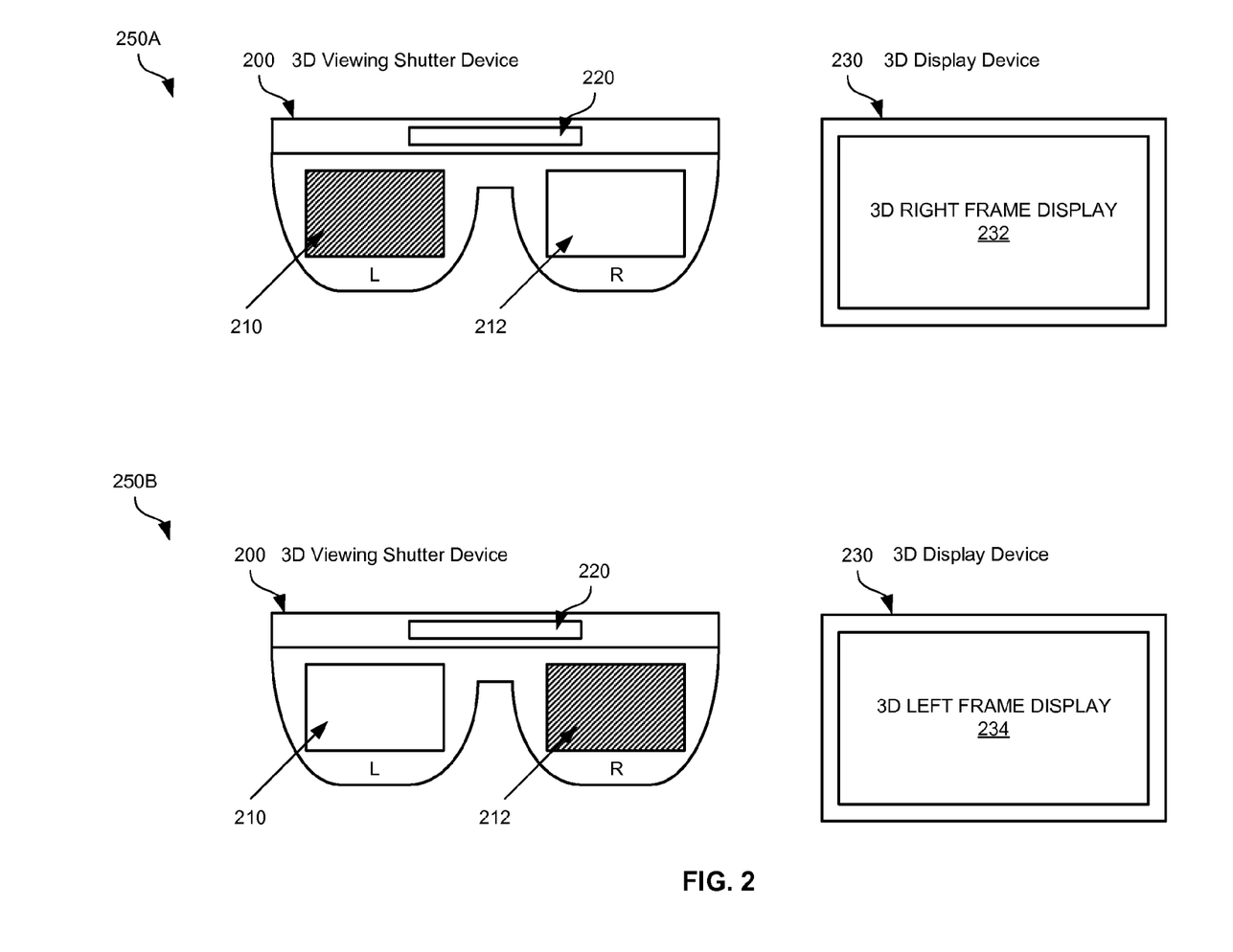
FIG. 2 is a diagram that illustrates exemplary synchronization of left and right shutters in a 3D viewing device with left view and right view 3D frames that are displayed on a 3D video display device, in accordance with an embodiment of the invention.

In operation, the sequence of left view and right view 3D video frames 150A may be displayed on a 3D video display device (shown in FIG. 2). The left view frame 100 is generated for viewing with a left eye and the right view frame 102 is generated for viewing with a right eye. When 3D videos are displayed in this manner, a viewer may utilize a 3D viewing device, for example 3D glasses (shown in FIG. 2). The 3D glasses may utilize a shuttering technique that may block vision in one eye while enabling vision in the other eye. This may be referred to as opening a shutter or closing a shutter. A viewing device that utilizes a shuttering technique may be referred to as 3D shutter glasses. Shuttering may be electronically controlled such that the left eye shutter is open only when an image for the left eye is being displayed on a display device, and the right eye shutter is open only when an image for the right eye is being displayed on the display device. When a shutter is closed, the image being displayed on the display is substantially blocked by the shutter. In various embodiments of the invention, the shutters are made using liquid crystal (LC) elements and such shutters are typically referred to as LC shutters.

Figure 1B:
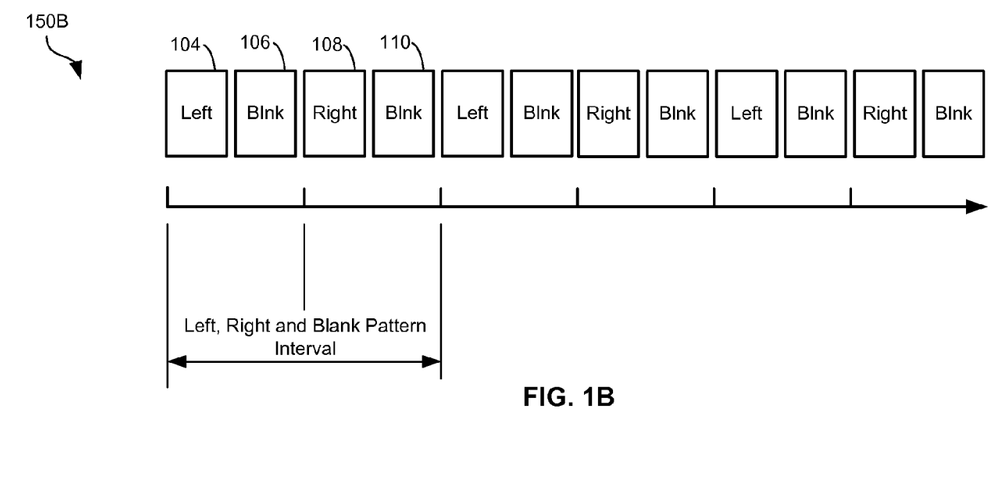
FIG. 1B is diagram that illustrates an exemplary sequence of left, right and blank 3D video frames, in accordance with an embodiment of the invention.

FIG. 1B is diagram that illustrates an exemplary sequence of left, right and blank 3D video frames, in accordance with an embodiment of the invention. Referring to FIG. 1B, there is shown a sequence comprising left view, right view and blank 3D video frames 150B that comprises a left view frame 104, a blank frame 106, a right view frame 108 and a blank frame 110.

The sequence comprising left view, right view and blank 3D video frames 150B may comprise stereoscopic video and/or graphics images as well as blank or black frames. The blank or black frames 106 and 110 may be utilized to reduce cross talk between left and right frames. For example, left and right 3D video frames may be displayed on a persistent display, such as a liquid crystal display (LCD). One frame of image data may be written to the display and corresponding pixels may be illuminated with the written content until another value is written over the first frame data. In instances when a screen may be partially illuminated with a left view frame and partially illuminated with a right view frame, a viewer may perceive crosstalk. One or more blank frames may be inserted between left and right frames, for example, in a pattern comprising left, right and blank frames, to compensate for display screen response time. A time offset for opening and closing of shutters may be utilized in shutter glasses to allow for the response time of a persistent display.

Similar to the sequence of frames 150A, the sequence of frames 150B may comprise alternating images from different video sequences that may be viewed concurrently by different people. For example, the frame 104 may correspond to one video sequence and the frame 108 may correspond to another video sequence. The frames corresponding to one video sequence may be considered analogous to the left view 3D frames and the frames corresponding to the other video sequence may be considered analogous to the right view 3D frames, for example. In some instances, the frames corresponding to one video sequence may be referred to as left view 3D frames and the frames corresponding to the second sequence may be referred to as the right view 3D frames.

FIG. 2 is a diagram that illustrates exemplary synchronization of left and right shutters in a 3D viewing device with left view and right view 3D frames that are displayed on a 3D video display device, in accordance with an embodiment of the invention. Referring to FIG. 2, there is shown a time instant 250A and a time instant 250B. In addition, there is shown a 3D viewing shutter device 200 that may comprise a left shutter 210 and a right shutter 212, and a shutter controller 220. Also shown is a 3D video display device 230, a displayed 3D right frame 232 and a displayed 3D left frame 234. The 3D viewing shutter device 200 and 3D video display device 230 are shown at time instant 250A and again at time instant 250B.

The 3D video display device 230 may comprise suitable logic, circuitry, interfaces and/or code that may be operable to display time sequential 3D video frames which may comprise left view frames, right view frames and/or blank frames such as, for example, the sequence of left view and right view 3D video frames 150A and the sequence comprising left view, right view and blank 3D video frames 150B. The left view frames, right view frames and/or blank frames may be referred to as left, right and/or blank frames. The invention is not limited to any specific type of 3D display device and may utilize any suitable 3D display device, for example, a liquid crystal display (LCD), a rear projector display or a plasma display may be utilized. Exemplary embodiments of the 3D video display device 230 may comprise a television, a computer monitor, a gaming device, a navigation device and/or a video projector, however, the invention is not limited in this regard. A viewer may utilize the 3D viewing shutter device 200 to perceive an illusion of 3D images in the 3D left view and right view frames. The 3D video display device 230 may be operable to communicate with the 3D viewing shutter device 200 to synchronize left and right shutters 210 and 212 with the display of left and right 3D frames 234 and 232. The 3D viewing shutter device 200 may comprise 3D shutter glasses and may be referred to as the 3D shutter glasses 200, for example. In addition, the 3D viewing shutter device 200 may be referred to as the 3D video viewing shutter device.

In various embodiments of the invention, the 3D video display device 230 and the 3D viewing shutter device 200 may be operable to communicate via a Bluetooth connection. Communication between the two devices may be synchronized with master and slave clocks. For example, the 3D viewing shutter device 200 may comprise a slave clock which is kept synchronized to a master clock comprised by the 3D video display device 230. The master and/or slave clocks may comprise master and slave Bluetooth clocks; however, the invention is not limited with regard to the type or source of a clock signal and may utilize any suitable clock mechanism.

In accordance with the Bluetooth wireless standard, for any connection between two Bluetooth-enabled devices, one device may take on the role of master device while the other may take on the role of slave device. At any instant in time, there may be multiple slave devices and a single master device. The master device may maintain a free-running counter, typically referred to as a Bluetooth clock. The slave device may maintain a copy of this counter, which the slave device phase-locks to the Bluetooth clock on the master device to within a few microseconds, for example. The phase of the slave clock may, in some embodiments, be updated when the slave device receives a packet from the master device. The Bluetooth clock may therefore provide a time reference that may be utilized to synchronize processes on both sides of the Bluetooth link. In this manner, a Bluetooth clock may be utilized to synchronize right and left shutters 212 and 210 in the 3D viewing shutter device 200 with the displayed 3D right frame 232 and the displayed 3D left frame 234 on the 3D video display device 230.

The 3D video display device 230 may comprise suitable logic, circuitry, interfaces and/or code that may be operable to determine when a left, right and/or blank 3D frames are being displayed and may be operable to generate a signal that indicates when 3D left frames, right frames and/or blank frames are displayed. The generated signal may be referred to as a frame synchronization signal. For example, a square wave may be generated that may measure as positive when a left frame is displayed and may measure as negative when a right frame is displayed. Notwithstanding, the invention is not limited in this regard, and any suitable frame synchronization signal or indicator of left, right and/or blank frame generation may be utilized. The 3D video display device 230 may record a time that is associated with a certain event in the frame synchronization signal or associated with a certain event that occurs when displaying left view, right view and/or blank 3D frames. For example, the 3D video display device 230 may record a time instant when a positive rising edge of a generated signal may indicate that a left view 3D frame is being refreshed on the 3D video display device 230. The 3D video display device 230 may communicate the recorded time instant to the 3D viewing shutter device 200.

The 3D viewing shutter device 200 may comprise suitable logic, circuitry, interfaces and/or code that may be operable to synchronize opening and closing of left and right shutters with a 3D frame refresh rate of a display screen, for example, of the 3D video display device 230. The 3D viewing shutter device 200 may be utilized when viewing 3D video and/or graphics frames on the 3D video display device 230 to create an illusion of viewing a three dimensional image. The 3D viewing shutter device 200 may comprise 3D shutter glasses and may be referred to as the 3D shutter glasses 200, however, the invention is not limited in this regard and any suitable form factor for the 3D viewing shutter device 200 may be utilized. In addition to glasses, exemplary form factors for the 3D viewing shutter device 200 may comprise goggles, a hat, a visor, a helmet, binoculars and/or a handheld device. In an exemplary pair of 3D shutter glasses 200, the shutter 210 that may correspond to a left eye may block light from reaching the left eye while the shutter 212 corresponding to a right eye may enable transmission of light to the right eye and vice versa. The left and right shutters 210 and 212 may be operable to close simultaneously.

The 3D shutter glasses 200 may be operable to communicate with the 3D video display device 230 to maintain clock synchronization. For example, the 3D shutter glasses 200 may be operable to maintain a slave clock that is phase locked to a master clock in the 3D video display device 230. In various exemplary embodiments of the invention, the master and slave clocks may comprise Bluetooth clocks; however, the invention is not limited in this regard. The 3D shutter glasses 200 may utilize the slave clock to control the left and right shutters 210 and 212 and to maintain synchronization with display of left and right 3D frames by the 3D video display device 230.

The shutter controller 220 in the 3D glasses 200 may comprise suitable logic, circuitry, interfaces, and/or code that may be operable to control the operation of the left and right shutters 210 and 212. In this regard, shutter control signals may be generated by the shutter controller 220 and may be communicated to the left and right shutters 210 and 212. In an exemplary embodiment of the invention, the shutters 210 and 212 may comprise LC shutters that may close and block light to a specified eye, when an appropriate voltage level from the shutter controller 220 is applied. Accurate synchronization of the left and right shutters 210 and 212 with the displayed 3D right frame 232 and the displayed 3D left frame 234 may be necessary to avoid bothersome or less than desirable flicker effects.

In operation, the 3D video display device 230 may generate left and right 3D video frames for display, such as, the displayed 3D right frame 232 and the displayed 3D left frame 234. A viewer may wear the 3D shutter glasses 200 that may be synchronized with the 3D video display device 230 when viewing the 3D video frames. At time instant 250A, the 3D video display device 230 may refresh its screen with the displayed 3D right frame 232. While the displayed 3D right frame 232 is illuminated, the shutter controller 220 in the 3D glasses 200 may enable viewing by the viewer's right eye via the right shutter 212 and may block light to a viewer's left eye with the left shutter 210. At time instant 250B, the 3D video display device 230 may refresh its screen with the displayed 3D left frame 234. While the displayed 3D left frame 234 is illuminated, the shutter controller 220 may enable viewing by the viewer's left eye via the left shutter 210 and may block light to the viewer's right eye with the right shutter 212. In various embodiments of the invention, one or more blank frames may be displayed in between illumination of the displayed 3D right frame 232 and the displayed 3D left frame 234 to avoid cross talk, for example. The shutter controller 220 may close both shutters 210 and 212 simultaneously and/or may delay opening of a shutter, for example, at times when cross talk or other unwanted visual effects may impair perceived image quality.

In various embodiments of the invention, the 3D shutter glasses 200 may be utilized for viewing two alternating sequences of video rather than for viewing left and right 3D video frames. For example, two people may each wear a pair of the shutter glasses 200 which may be synchronized with the video display device 230. In this regard, at a first time instant both shutters of a first viewer's glasses may open while a frame from the first video sequence is displayed and both shutters of a second viewer's glasses may close. At the next time instant, both shutters of the second viewer's glasses may open while a frame from the second video sequence is displayed and the shutters of the first viewer's glasses may close.

Figure 3:
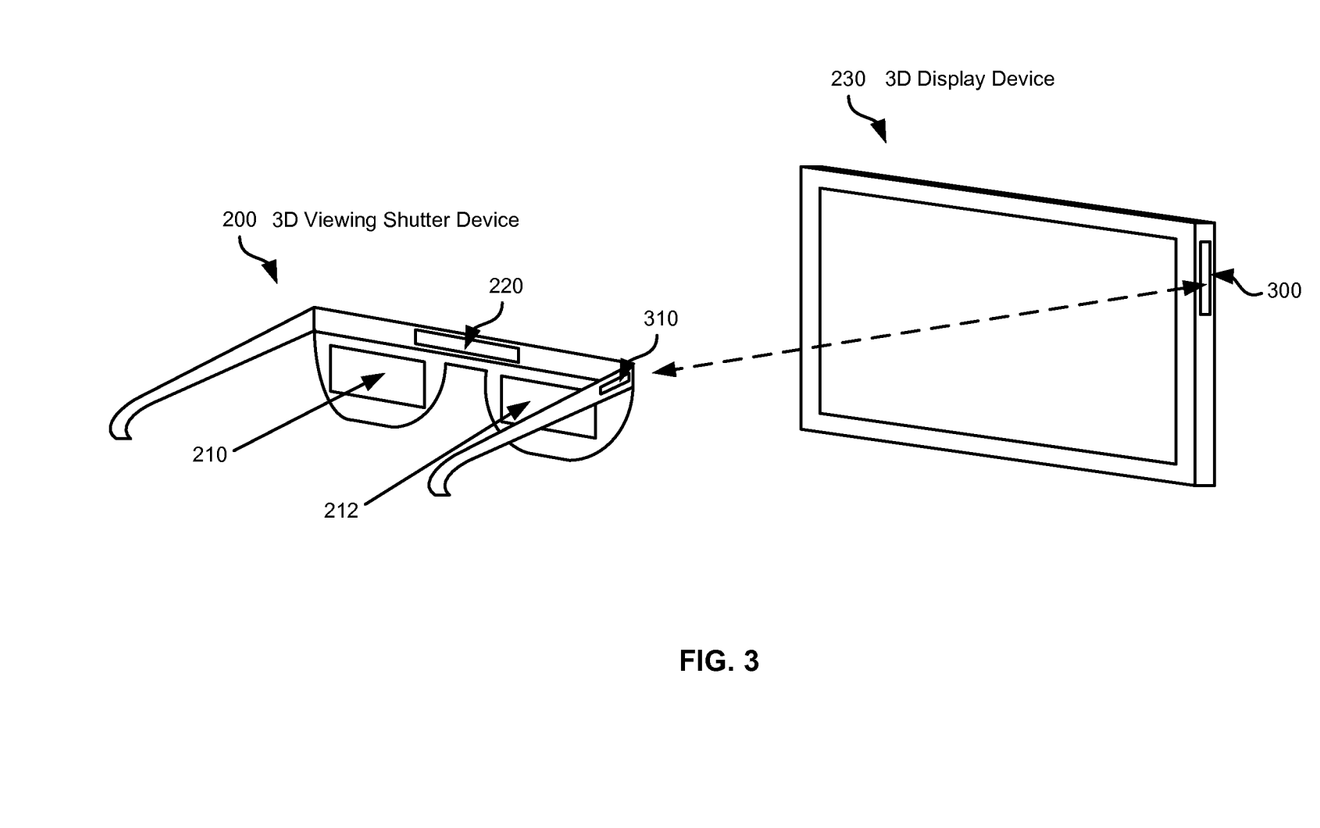
FIG. 3 is a diagram that illustrates an exemplary wireless communication link between a 3D viewing shutter device and a 3D video display device, in accordance with an embodiment of the invention.

FIG. 3 is a diagram that illustrates an exemplary wireless communication link between a 3D viewing shutter device and a 3D video display device, in accordance with an embodiment of the invention. Referring to FIG. 3, there is shown the 3D video display device 230 that may comprise a first wireless device 300. Also shown is the 3D viewing shutter device 200 that may comprise the left shutter 210, the right shutter 212, the shutter controller 220 and a second wireless device 310. The 3D viewing shutter device 200 may be referred to as the 3D shutter glasses 200.

The 3D video display device 230 and the 3D shutter glasses 200 which are described with respect to FIG. 2 may be operable to communicate via a wireless link between the first wireless device 300 and the second wireless device 310. The wireless link may be utilized to communicate information that enables clock synchronization in the two devices, and/or to communicate information about when a left frame, a right frame and/or a blank frame are displayed. Moreover, the wireless link may be utilized to communicate information about when a left, right and/or blank frame sequence and/or frame pattern is displayed. Moreover, the wireless link may be utilized to communicate 3D frame refresh rates and/or an interval of time over which a pattern or sequence of left, right and/or blank frames may be displayed. In various exemplary embodiments of the invention, the wireless link may be utilized to communicate a time offset which may be utilized by the 3D shutter glasses 200 to implement a time delay before opening or closing shutters in the 3D shutter glasses 200, for example, in order to mitigate crosstalk.

The first wireless device 300 may be integrated or coupled to the 3D video display device 230 and the second wireless device 310 may integrated and/or coupled to the 3D shutter glasses 200. In instances when a projector is used to display 3D images on a screen, the first wireless device 300 may be integrated within the projector. A wireless connection may be established between the first wireless device 300 and the second wireless device 310 for viewing left and right 3D video frames through the 3D shutter glasses 200. In an exemplary embodiment of the invention, when the first wireless device 300 and the second wireless device 310 are both Bluetooth devices, the first wireless device 300 may operate a Bluetooth master clock and the second wireless device 310 may operate a Bluetooth slave clock to facilitate communication between the two devices.

In various embodiments of the invention, the second wireless device 310 may be integrated within the shutter controller 220 in the 3D shutter glasses 200. While FIG. 3 shows the second wireless device 310 as being disposed on one side of the 3D shutter glasses 200, this is merely for illustrative purposes. The second wireless device 310 may be placed on, integrated within and/or connected to any portion of the 3D glasses 200 that may enable wireless communication with the first wireless device 300.

Wireless technology that may be utilized to synchronize control of left and right shutters in the 3D shutter glasses 200 to left, right and/or blank frame image generation on a screen of the 3D video display device 230, may include, but need not be limited to, personal area network (PAN) technologies such as Bluetooth, Ultra-Wideband (UWB), Z-Wave, and ZigBee, for example. For example, in instances when the 3D shutter glasses 200 utilize Bluetooth technology, Bluetooth clocks may enable synchronization of 3D shutters glasses. Technologies that support wireless communication over the Industrial, Scientific, and Medical (ISM) 2.4 GHz radio frequency bandwidth may also be used. Similarly, technologies that support wireless communication over 900 MHz, 1.9 GHz, and 5.8 GHz, such as those technologies used in cordless phone applications, for example, may also be used to synchronize the shutter controller 220 to the image generation process in the 3D video display device 230. In various embodiments of the invention, technologies for use in wireless local area network (WLAN) applications, such as WiFi or those based on IEEE 802.11 standards, for example, may also be used to synchronize the shutter controller 220 to the image generation process in the 3D video display device 230.

In operation, the 3D video display device 230 may display 3D video and/or graphics content comprising sequential left and right view frames. A viewer may utilize the 3D shutter glasses 200 to view the sequential left and right frames. In various embodiments of the invention, the 3D shutter glasses and the 3D video display device 230 may establish a wireless connection via the first and second wireless devices 300 and 310 in order to synchronize operation of the shutters 210 and 212 with display of 3D left and right frames by the 3D video display device 230. The first wireless device 300 and the second wireless device 310 may be operable to communicate information that enables clock synchronization, and/or information about when a left, a right and/or a blank frame or sequence of frames may be displayed on the 3D video display device 230. In addition the first and second wireless devices 300 and 310 may be operable to communicate 3D frame refresh rates and/or an interval or period of time over which a pattern of left, right and/or blank frames may be displayed. The first and second wireless devices 300 and 310 may also be operable to communicate a time offset and/or a time delay for opening and/or closing shutters in the 3D shutter glasses 200.

The first and second wireless devices 300 and 310 may be operable to perform two-way communication via the wireless connection. The first wireless device 310 may be operable to similarly communicate with a plurality of 3D shutter glasses. In other exemplary embodiments of the invention, the first wireless device 300 in the 3D video display device 230 may broadcast shutter sync information for reception by one or more devices such as the 3D shutter glasses 200 that may be located within communication range. In various embodiments of the invention, the 3D shutter glasses 200 may be operable to receive communication from the 3D video display device 230 but may not transmit information to the display device 230.

Figure 4:
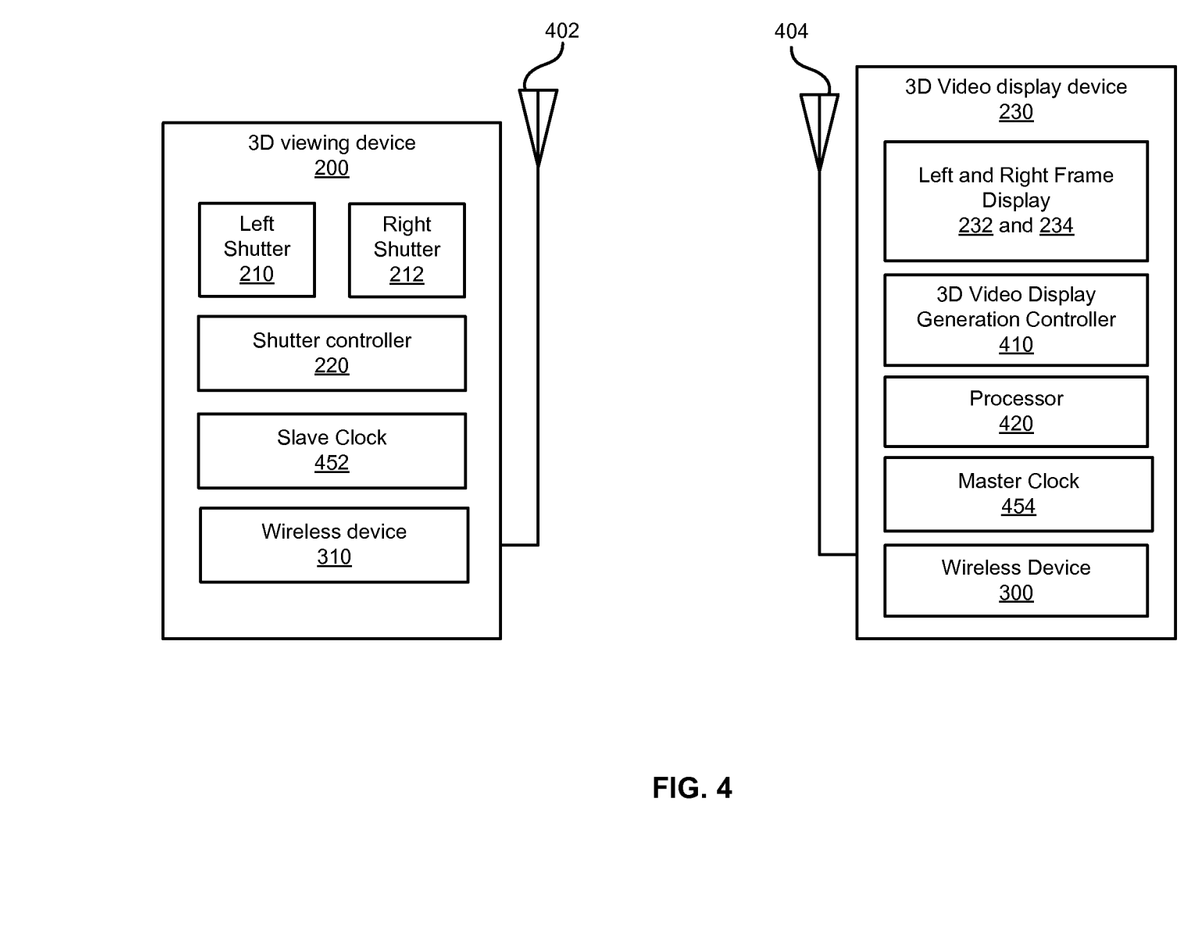
FIG. 4 is block diagrams that illustrates an exemplary 3D viewing shutter device that is operable to determine when to open and close left and right shutters based on clock and 3D frame refresh information received from a 3D video display device via a wireless link, in accordance with embodiments of the invention.

FIG. 4 is block diagrams that illustrates an exemplary 3D viewing shutter device that is operable to determine when to open and close left and right shutters based on clock and 3D frame refresh information received from a 3D video display device via a wireless link, in accordance with embodiments of the invention. Referring to FIG. 4, there is shown the 3D video display device 230 and the 3D viewing shutter device 200. The 3D video display device 230 may comprise the displayed 3D right frame 232 and the displayed 3D left frame 234, a 3D video generation controller 410, a processor 420, a master clock 454, the first wireless device 300 and an antenna 404. The 3D viewing device 200 may comprise the shutter controller 220, a slave clock 452, the second wireless device 310 and an antenna 402. The 3D viewing device 200 may be referred to as the 3D shutter glasses 200.

Aspects of the video display device 230, the displayed 3D right frame 232, the displayed 3D left frame 234, the 3D viewing device 200, the shutter controller 220, the left shutter 210, the right shutter 212 and the first and second wireless devices 300 and 310 are described with respect to FIG. 1A, FIG. 1B, FIG. 2 and FIG. 3.

The antennas 402 and 404 may comprise suitable logic, circuitry, interfaces and/or code that may be operable to transmit and/or receive signals among the 3D viewing device 200 and the 3D display device 230. For example, the antennas 402 and/or 404 may be operable to handle frequency bands that may be utilized for communication based on the wireless technologies described with respect to FIG. 2, such as for example, Bluetooth communication. The antennas 402 and 404 may be located internally and/or externally with respect to the 3D viewing device 200 and the 3D video display device 230 respectively.

In an exemplary embodiment of the invention, the 3D video display device 230 and the 3D viewing device 200 may be operable to communicate based on Bluetooth communication standards, however, the invention is not limited in this regard and any suitable standard or non-standardized wireless technology may be utilized. The video display device 230 may comprise suitable logic, circuitry, interfaces and/or code that may be operable to maintain the master clock 454. The master clock 454 may comprise a counter, for example, a counter utilized in a Bluetooth master clock. The 3D viewing device 200 may comprise the slave clock 452 which may be generated based on reference signals from the master clock 454. The slave clock 452 may be utilized as a reference clock for controlling opening and closing of the left and right shutters 210 and 212. The slave clock 452 may be phase locked to the master clock 454. For example, the phase of the slave clock 452 may be updated when packets sent by the 3D video display device 230 via the wireless first device 300 and the antenna 404 are received by the 3D shutter glasses 200 via the antenna 402 and the second wireless device 310. In this manner, the phase of the slave clock may be accurate within a few microseconds, for example. The master clock 454 and the slave clock 452 may comprise Bluetooth clocks.

The 3D video generation controller 410 may comprise suitable logic, circuitry, interfaces and or code that may be operable to generate a sequence of 3D left, right and/or blank frames that are displayed on the 3D video display device 230. For example, the 3D video generation controller 410 may be operable to generate the displayed 3D right and left frames 232 and 234. Moreover, the 3D video generation 410 may be operable to generate a pattern of frames, such as for example, the pattern of frames comprising the left view frame 104, the blank frame 106, the right view frame 108 and the blank frame 110 and/or, for example, the left frame 100 and the right frame 102. In addition, the 3D video generation controller 410 may be operable to generate a frame synchronization signal that may indicate when the 3D left, right and/or blank frames are displayed. A frame synchronization signal is described with respect to FIG. 2. For example, the 3D video generation controller may generate a square wave that may be positive when a left frame is displayed and may be negative when a right frame is displayed. Notwithstanding, the invention is not limited in this regard, and any suitable signal may be utilized.

The processor 420 may comprise suitable logic, circuitry, interfaces and/or code that may be operable to record a time instant from the master clock 454 when the display device 230 is refreshed with a new 3D left or right frame or at the beginning of a pattern or sequence of left, right and/or blank frames. For example, the processor 420 may record a time instant that is associated with a rising edge of a frame synchronization signal which may comprise a square wave. The rising edge may indicate that, for example, a left frame from the beginning of a pattern of left, right and/or blank frames is being refreshed on the 3D video display device 230. Alternatively, a vertical or horizontal sync pulse that may be generated at the beginning of a frame when a frame is written to a display, may be utilized to associate a master clock time instant with 3D frame refresh, for example. The processor 420 may be operable to communicate the recorded time instant to the 3D viewing shutter device 200. In addition, the processor 420 may be operable to communicate a time interval over which a corresponding pattern of left, right and/or blank frames is displayed on the 3D viewing device 200, via the first wireless device 300 and the antenna 404. In instances when, for example, the pattern of left, right and/or blank frames changes, the interval over which a pattern occurs changes, the display of 3D material starts or stops, or for example, a refresh rate changes, the processor 420 may communicate new information that corresponds to the changes to the 3D shutter glasses 200. These types of changes may occur when a channel is changed, for example.

In various embodiments of the invention, the processor 420 may be operable to determine a time offset for opening and/or closing left and right shutters, for example, to avoid left, right image crosstalk or other undesirable visual effects. The time offset may be dependent on the type of display utilized in the 3D video display device 230. For example, a persistent LCD display may cause the crosstalk as described with respect to FIG. 2. In this regard, the 3D video display device 230 may be operable to communicate the time offset to the 3D shutter glasses 200 via the first wireless device 300 and the antenna 404.

The shutter controller 220 in the 3D glasses 200 may be operable to receive the time instant of the beginning of a pattern of the left, right and/or blank frames, the duration of a time interval over which the pattern of left, right and/or blank frames are displayed and/or a time offset. The shutter controller 220 may utilized the received information along with reference clock signals from the slave clock 452 to determine when to open and close the left and right shutters 210 and 212. The shutter controller 220 may generate shutter control signals having phases that are tightly synchronized to the phases of the video generation process on the video display device 230. Those shutter control signals may be used to synchronize the opening and closing of the shutters 210 and 212 to the 3D video being displayed in the video display device 230.

In operation, the 3D video display device 230 may maintain a master clock 454 and may align transmissions to the 3D shutter glasses 200 with the master clock 454. The 3D shutter glasses 200 may receive the transmissions from the 3D video display device 230 via the second wireless device 310 and may phase lock the slave clock 452 utilizing the received transmissions. In this regard, the 3D shutter glasses 200 may comprise a replica of the master clock 454. The master clock 454 and/or the slave clock 452 may comprise Bluetooth clocks. The video generation controller 410 may write left, right and/or blank frames to be displayed on the 3D video display device 230 and may generate a corresponding frame synchronization signal that may indicate when the frames are refreshed and/or sustained on the display. The processor 420 may receive the frame synchronization signal and may detect when a pattern of left, right and/or blank frames may be generated. The processor 420 may be operable to record a time instant when a specified point in the pattern occurs.

The processor 420 may be operable to determine a time interval or period of the pattern. The processor 420 may be operable to determine a time offset, for example, based on the type of display utilized in the 3D video display device 230 for delaying opening and/or closing of shutters in the 3D shutter glasses 200. The processor 420 may be operable to communicate the recorded time instant, the determined time interval and/or the determined time offset, for example, to the 3D viewing device 200 via the first wireless device 300 and the antenna 404. The processor 420 may not need to send the communicated information each clock period or at each interval of a left, right and/or blank frame pattern since the 3D shutter glasses may utilize the slave clock 452 as reference along with the communicated information for determining when to open and close the left and right shutters 210 and 212 over a plurality of cycles. The frequency of communicating the information may depend on frequency drift of the slave clock 452 in the 3D shutter glasses 200 or a change of, for example, 3D frame refresh rate in the 3D video display device 230. Furthermore, processor 420 may be operable to cease transmissions of timing information to the 3D shutter glasses 200 if it determines that the video material being displayed on video display device 230 is not currently in a 3D format. Processor 420 may send a signal to 3D shutter glasses 200 indicating that the video being displayed is no longer in a 3D format. 3D shutter glasses 200 may then enter a mode where both right and left shutters are constantly opened. If processor 420 detects that 3D material is again being displayed on video display device 230, it may again send appropriate timing information to 3D shutter glasses 200 to resume the shutter switching necessary for viewing of the video material with 3D effect.

The 3D shutter glasses 200 may be operable to receive the recorded time instant, the determined time interval and/or the determined time offset via the second wireless device 310 and the antenna 402. The shutter controller 220 may be operable to determine when to open and close the left and right shutters 210 and 212 based on the received information and utilizing the slave clock 452 as a time reference. The shutter controller 220 may be operable to generate left and/or right shutter control signals that may open and close the left and right shutters 210 and 212 at suitably precise time instants such that only the left shutter 210 is open while a left frame is displayed and only the right shutter 212 is open when a right frame is displayed. In this regard, the 3D shutter glasses 200 may avoid enabling a perception of crosstalk by a viewer.

In a similar manner, the 3D video display device 230 may be operable to communicate and/or enable synchronization with a plurality of 3D shutter glasses for controlling left and right shutters in the plurality of 3D shutter glasses.

The shutter controller 220 in the 3D glasses 200 may be operable to accurately predict or determine when each 3D left and right image is to be displayed based on a single clock value (e.g., Bluetooth clock). Therefore, the clock value need not be recorded for every image displayed in the video display device 230. When a Bluetooth clock value is being used, for example, clock values may need to be recorded and communicated often enough such that the drift of the slave clock 452 and master clock 545 relative to the timing of the sequence of video images does not cause a discrepancy that may impact or affect the quality of the 3D video perceived by a viewer. By transmitting timing information only often enough to correct for this clock drift rather than for every video frame, the duty cycle of the radio communication can be made relatively low, thereby conserving energy.

Moreover, the above-described system and/or method may be highly robust against interference that may cause packets to be lost and/or retransmitted. The 3D glasses may continue to switch between right and left shutters in substantial synchronization with the video display device even though the timing of the radio communication may fluctuate. As an additional advantage, the above-described system is relatively insensitive to delays in the transmission of the timing information. The transmission delays may occur when packets are lost due to interference and are retransmitted later. Transmission delays may also occur when other radio traffic takes priority over the timing information transmissions.

The low duty cycle of the radio communication enabled by the approach described above may further keep bandwidth available for other applications to share the wireless device 300 on the video display device 230.

Figure 5:
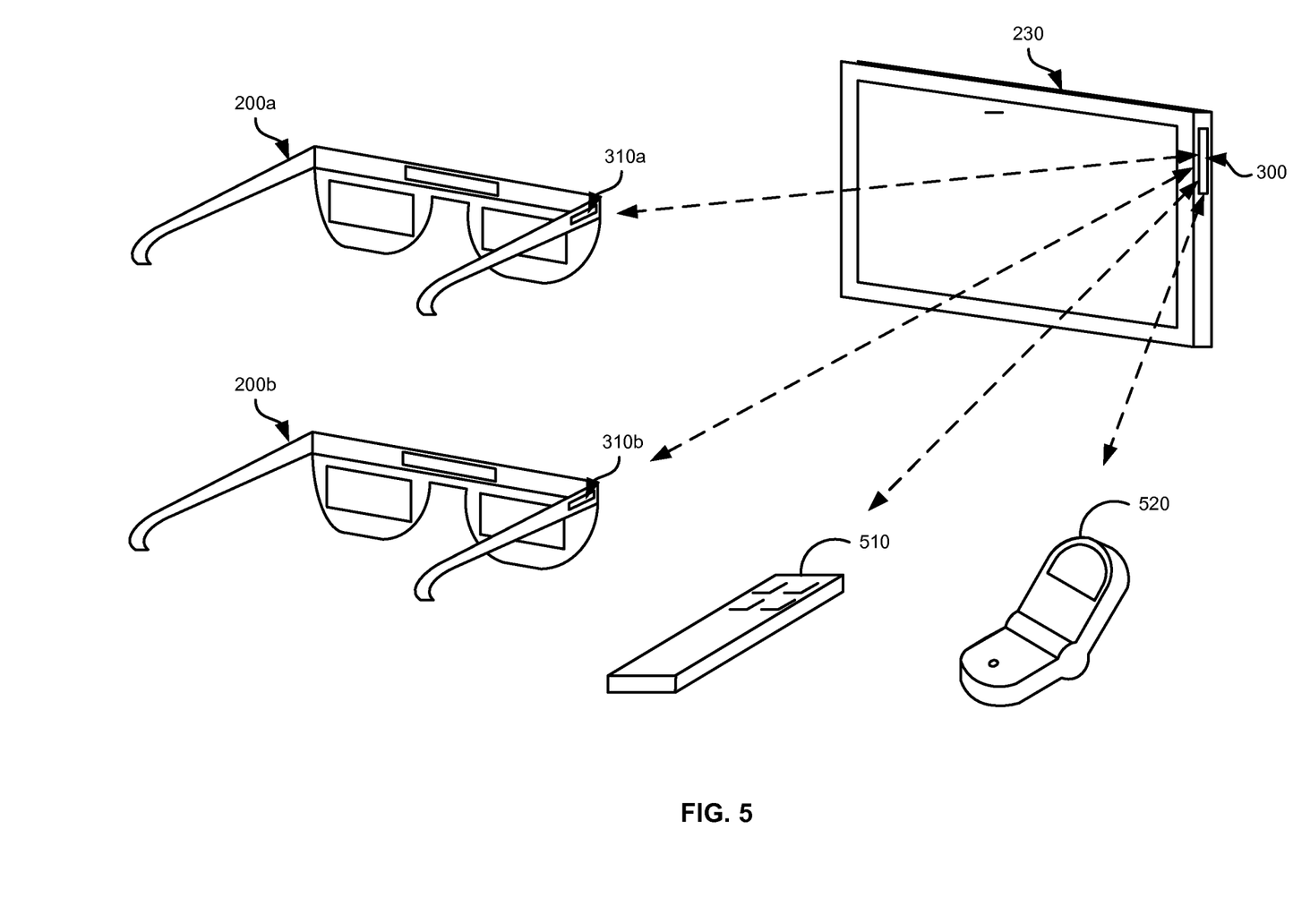
FIG. 5 is a diagram that illustrates a plurality of exemplary 3D shutter glasses and other wireless devices communicating with a 3D video display device via Bluetooth wireless connections, in accordance with an embodiment of the invention.

FIG. 5 is a diagram that illustrates a plurality of exemplary 3D shutter glasses and other wireless devices communicating with a 3D video display device via Bluetooth wireless connections, in accordance with an embodiment of the invention. Referring to FIG. 5, there is shown 3D shutter glasses 200a comprising a wireless device 310a, 3D shutter glasses 200b comprising a wireless device 310b, a handheld wireless communication device 510 and a mobile phone 520. In addition, there is shown the 3D video display device 230 that comprises the first wireless device 300.

The 3D shutter glasses 200a that comprise the wireless device 310a and the 3D shutter glasses 200b that comprise the wireless device 310b are similar and/or substantially the same as the 3D shutter glasses 200 that comprise the second wireless device 310.

The 3D video display device 230 may be operable to communicate with and/or enable synchronization with a plurality of 3D shutter glasses for controlling left and right shutters in the same or a similar manner as described with respect to FIG. 1A, FIG. 1B, FIG. 2, FIG. 3 and FIG. 4 for the shutter glasses 200. The 3D video display device 230 is shown in FIG. 5 as communicating with two pairs of 3D shutter glasses, however, the invention is not limited with regard to the number of 3D shutter glasses that the 3D video display device 230 may communicate with, and may utilize any suitable number of 3D shutter glasses in accordance with implementation constraints.

The handheld wireless communication device 510 which may, for example, comprise a remote control and the mobile phone 520 may comprise suitable logic circuitry and/or code that may be operable to communicate with the 3D video display device 230 via the first wireless device 300. For example, the handheld wireless communication device 510 and the mobile phone 520 may be operable to communicate based on Bluetooth communication standards with the 3D video display device 230. In instances when Bluetooth technology is utilized, the first wireless device 300 in the video display device 230, which may be used as a master device, may not only communicate with a plurality of 3D glasses, such as the 3D glasses 200a and/or the 3D glasses 200b but may also service other Bluetooth devices such as the handheld wireless communication device 510 and/or the mobile phone 520. Other Bluetooth devices which may also be serviced by the first wireless device 300 may comprise stereo headphones (not shown), surround sound speakers (not shown), or other like devices. The first wireless device 300 in the video display device 230 may also be used to receive pictures and/or videos that may be transmitted, for example, from the mobile phone 520 or a video camera (not shown), for example.

Figure 6:
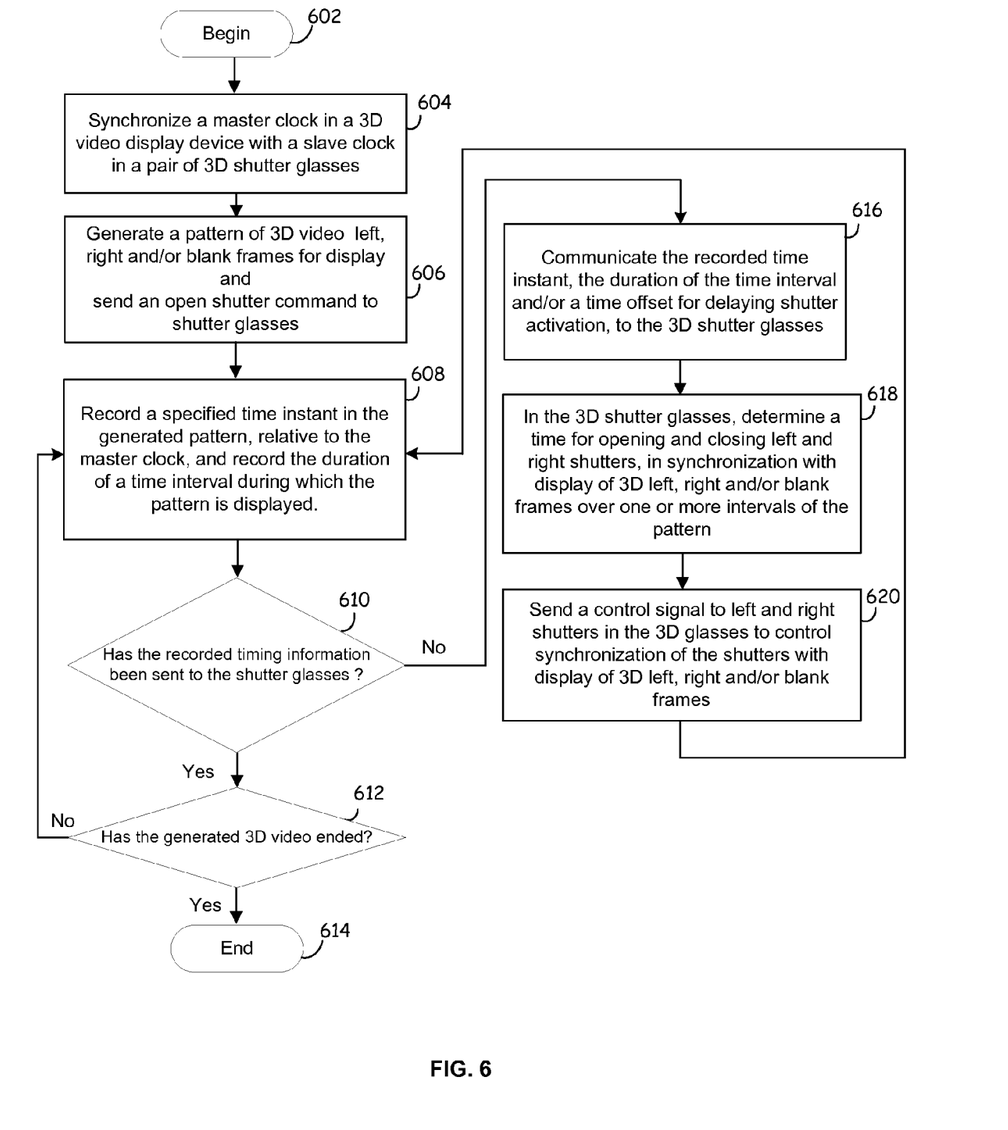
FIG. 6 is a flow chart illustrating exemplary steps for synchronizing 3D shutter glasses to a television 3D frame refresh rate, in accordance with an embodiment of the invention.

FIG. 6 is a flow chart illustrating exemplary steps for synchronizing 3D shutter glasses to a television 3D frame refresh rate, in accordance with an embodiment of the invention. Referring to FIG. 6, the exemplary steps may begin at step 602. In step 604, the slave clock 452 in the pair of 3D shutter glasses 200 may be synchronized with a master clock 454 in the 3D video display device 230. In step 606, a pattern of 3D video left, right and/or blank frames, for example, the left view frame 104, the blank frame 106, the right view frame 108 and the blank frame 110, may be generated for display by the 3D video generation controller 410 in the 3D video display device 230. In addition, a command to open shutters may be communicated to shutter glasses. In step 608, a specified time instant in the generated pattern comprising, for example, the left view frame 104, the blank frame 106, the right view frame 108 and the blank frame 110, relative to the master clock 454 may be recorded, and the duration of a time interval during which the pattern is displayed may be recorded. In step 610, in instances when the recorded timing information has already been sent to the shutter glasses, the exemplary steps may proceed to step 612. In step 612, if the generated video has ended, the exemplary steps may proceed to step 614. The exemplary steps may end at step 614.

In step 610, in instances when the recorded timing information has not been sent to the shutter glasses, the exemplary steps may proceed to step 616. In step 616, the recorded time instant, the duration of the time interval and/or a time offset for delaying activation of the shutter 210 and/or the shutter 212 may be communicated to the 3D shutter glasses 200. In step 618, in the 3D shutter glasses 200, time instants may be determined for opening and/or closing the left and right shutters 210 and 212, such that the shutters are operated in synchronization with display of the pattern of 3D left, right and/or blank frames and/or repeated displays of the pattern. In step 620, a control signal may be sent to the left and right shutters 210 and 212 in the 3D shutter glasses 200 to control synchronization of the shutters with the display of 3D left, right and/or blank frames. The exemplary steps may proceed to step 608.

In step 612, if the generated video has not ended, the exemplary steps may proceed to step 608.

In an embodiment of the invention, the 3D video viewing shutter device 200 that is wirelessly coupled to the 3D video display device 230 may generate the slave clock 452 based on the master clock 454 in the 3D video display device 230. The 3D video viewing shutter device 200 may maintain synchronization with the master clock 454. The 3D video viewing shutter device 200 may receive from the 3D video display device 230, information about display of the 3D video frames comprising the left frame 104, the blank frame 106, the right frame 108 and the blank frame 108, for example. The 3D video viewing shutter device 200 may also receive from the 3D video display device 230, time information that is referenced to the master clock 454. The time information may correspond to a time of display of the 3D video frames comprising the left frame 104, the blank frame 106, the right frame 108 and the blank frame 108, for example. The 3D video viewing shutter device 200 may determine when to open and close left and right shutters 210 and 212 to correspond to the time of the display of the 3D video frames comprising the left frame 104, the blank frame 106, the right frame 108 and the blank frame 108, for example. The determination may be based on the generated slave clock 452, the received information about the display of the 3D video frames comprising the left frame 104, the blank frame 106, the right frame 108 and the blank frame 108, for example, and/or the received time information that is referenced to the master clock 454. The slave clock 452 and the master clock 454 may comprise a Bluetooth slave clock and a Bluetooth master clock respectively. The information about the display of 3D video frames comprising the left frame 104, the blank frame 106, the right frame 108 and the blank frame 108, for example, may comprise information about a pattern of left, right and/or blank frames that are displayed on the 3D video display device 230. Furthermore, the information about the display of 3D video frames comprising the left frame 104, the blank frame 106, the right frame 108 and the blank frame 108, for example, may comprise length of a time interval that corresponds to display of a pattern of left, right and/or blank frames that are displayed on the 3D video display device 230, for example, a pattern comprising the left frame 104, the blank frame 106, the right frame 108 and the blank frame 108. The information about the display of 3D video frames comprising the left frame 104, the blank frame 106, the right frame 108 and the blank frame 108, for example, may comprise a refresh rate for displaying left, right and/or blank frames that are displayed on the 3D video display device 230. The time information that is referenced to the master clock 454 may indicate master clock 454 time that corresponds to the display of 3D video frames comprising the left frame 104, the blank frame 106, the right frame 108 and the blank frame 108, for example. The information about the display of 3D video frames comprising the left frame 104, the blank frame 106, the right frame 108 and the blank frame 108, for example, may comprise a time offset for delaying opening and/or closing of left and right shutters 210 and 211. Opening and closing of the left and right shutters 210 and 212 may be based on the generated slave clock 452, the received information about the display of 3D video frames comprising the left frame 104, the blank frame 106, the right frame 108 and the blank frame 108, for example, and the received time information that is referenced to the master clock 454. Maintaining a correspondence in time between time of the opening and closing the left and right shutters 210 and 212 and the time of the display of the 3D video frames comprising the left frame 104, the blank frame 106, the right frame 108 and the blank frame 108, for example, when new information about the display of 3D video frames, and new time information that is referenced to the master clock 454, is not received and/or not utilized. In various embodiments of the invention, information may be transmitted by the 3D video viewing shutter device 200 to the 3D video display device 230. The invention may further enable viewing of different and/or independent video streams by two or more individuals. In this regard, coordination by the master clock 454 and/or the slave clock 452, may enable opening both shutters on a first viewer's shutter glasses during display of a first frame while closing both shutters on a second viewer's glasses and during display of a second frame, closing both shutters on the first viewer's glasses while opening both shutters of the second viewer's glasses. In this regard, the first frame may correspond to a first video sequence and the second frame may correspond to a second video sequence.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for synchronizing 3D shutter glasses to a television refresh rate.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication in a 3D video viewing shutter device that is wirelessly coupled to a 3D video display device, the method comprising:
    generating a slave clock based on a master clock generated in said 3D video display device;
    maintaining synchronization of said slave clock with said master clock;
    receiving, from said 3D video display device, a time interval associated with display of 3D video frames and a time offset with respect to said time interval for delaying opening and/or closing of left and/or right shutters of said 3D video viewing shutter device, said time interval being based upon a frame synchronization signal generated by said 3D video display device, said frame synchronization signal being at a positive value of a square wave indicating a left frame is to be displayed by said 3D video viewing shutter device or at a negative value of said square wave indicating a right frame is to be displayed by said 3D video viewing shutter device; and
    opening and/or closing said left and/or right shutters of said 3D video viewing shutter device to correspond to a time of said display of said 3D video frames based on said generated slave clock, said time interval, and said time offset.

2. The method according to claim 1, wherein said slave clock and said master clock comprise a Bluetooth slave clock and a Bluetooth master clock respectively.

3. The method according to claim 1, wherein receiving said time interval comprises:
    receiving information about a pattern of left view frames, right view frames, and/or blank frames that are displayed on said 3D video display device.

4. The method according to claim 1, wherein receiving said time interval comprises:
    receiving a length of said time interval corresponding to displaying a pattern of left view frames, right view frames, and/or blank frames that are displayed on said 3D video display device.

5. The method according to claim 1, wherein receiving said time interval comprises:
    receiving a refresh rate for displaying left view frames, right view frames, and/or blank frames that are displayed on said 3D video display device.

6. The method according to claim 1, wherein said time interval that is referenced to said master clock indicates a specified time instant within a pattern of left view frames, right view frames, and/or blank frames that are displayed on said 3D video display device.

7. The method according to claim 1, wherein said opening and/or closing said left and/or right shutters comprises:
    delaying opening and/or closing said left and/or right shutters based on said time offset.

8. The method according to claim 6, wherein said opening and/or closing said left and/or right shutters comprises:
    opening and/or closing said left and/or right shutters based on said specified time instant within said pattern of said left view frames, said right view frames, and/or said blank frames.

9. The method according to claim 1, further comprising:
    maintaining a correspondence in time between a time of said opening and/or closing said left and/or right shutters and said time of said display of said 3D video frames when new information about said display of 3D video frames and a new time interval that is referenced to said master clock is not received and/or not utilized.

10. The method according to claim 1, further comprising:
    transmitting data information to said 3D video display device.

11. The method of claim 1, wherein said 3D video frames comprise:
    blank frames to reduce crosstalk between left view frames and right view frames included in said 3D video frames.

12. The method of claim 1, wherein said time interval comprises:
a duration of time during which said 3D video frames are displayed on said 3D video display device.

13. A system for communication, the system comprising:
one or more processors and/or circuits for use in a 3D video viewing shutter device, said 3D video viewing shutter device being wirelessly coupled to a 3D video display device, wherein said one or more processors and/or circuits are configured to:
generate a slave clock based on a master clock generated in said 3D video display device;
maintain synchronization of said slave clock with said master clock;
receive, from said 3D video display device, a time interval associated with display of 3D video frames and a time offset with respect to said time interval to delay opening and/or closing of left and/or right shutters of said 3D video viewing shutter device, said time interval being based upon a frame synchronization signal generated by said 3D video display device, said frame synchronization signal being at a first value, corresponding to a positive rising edge of said frame synchronization signal, indicating a left frame is to be displayed by said 3D video viewing shutter device or at a second value indicating a right frame is to be displayed by said 3D video viewing shutter device; and
open and/or close said left and/or right shutters of said 3D video viewing shutter device to correspond to a time of said display of said 3D video frames based on said generated slave clock, said time interval, and said time offset.

14. The system according to claim 13, wherein said slave clock and said master clock comprise a Bluetooth slave clock and a Bluetooth master clock respectively.

15. The system according to claim 13, wherein said time interval comprises:
information about a pattern of left view frames, right view frames, and/or blank frames that are displayed on said 3D video display device.

16. The system according to claim 13, wherein said time interval comprises:
a length of said time interval corresponding to displaying a pattern of left view frames, right view frames, and/or blank frames that are displayed on said 3D video display device.

17. The system according to claim 13, wherein said time interval comprises:
a refresh rate for displaying left view frames, right view frames, and/or blank frames that are displayed on said 3D video display device.

18. The system according to claim 13, wherein said time interval that is referenced to said master clock indicates a specified time instant within a pattern of left view frames, right view frames, and/or blank frames that are displayed on said 3D video display device.

19. The system according to claim 13, wherein said one or more processors and/or circuits are configured to delay opening and/or closing of said left and/or right shutters based on said time offset.

20. The system according to claim 18, wherein said one or more processors and/or circuits are configured to open and/or close said left and/or right shutters based on said specified time instant within said pattern of said left view frames, said right view frames, and/or said blank frames.

21. The system according to claim 13, wherein said one or more processors and/or circuits are configured to maintain a correspondence in time between a time of opening and/or closing said left and/or right shutters and said time of said display of said 3D video frames when new information about said display of 3D video frames and a new time interval that is referenced to said master clock is not received and/or not utilized.

22. The system according to claim 13, wherein said one or more processors and/or circuits are configured to transmit data information to said 3D video display device.

23. The system of claim 13, wherein said 3D video frames comprise:
blank frames to reduce crosstalk between left view frames and right view frames included in said 3D video frames.

24. The system of claim 13, wherein said time interval comprises:
a duration of time during which said 3D video frames are displayed on said 3D video display device.

* * * * *